April 23, 1968  A. C. AUSTIN  3,379,813

PROCESS FOR FORMING ARCUATE RIGID PLASTIC PLATE

Filed March 1, 1965  2 Sheets-Sheet 1

INVENTOR.
Arthur C. Austin
BY
Robert F. Hause
ATTORNEY

United States Patent Office 3,379,813
Patented Apr. 23, 1968

3,379,813
PROCESS FOR FORMING ARCUATE RIGID PLASTIC PLATE
Arthur C. Austin, Kenmore, N.Y., assignor to National Gypsum Company, Buffalo, N.Y., a corporation of Delaware
Filed Mar. 1, 1965, Ser. No. 436,252
17 Claims. (Cl. 264—227)

ABSTRACT OF THE DISCLOSURE

A process, and the resultant product, wherein an arcuate, rigid plastic punching plate is molded within a flexible female mold, while the flexible mold is held with a desired curvature during the hardening and curing of the rigid plastic plate, and applying a high density plating material to the face of the plate. In particular, a mineral wool acoustical tile is first routed out to the desired design to be ultimately produced by the arcuate, rigid punching plate, on which tile there is produced a low melting alloy male pattern, from which pattern the flexible female mold is formed, in a flat form.

---

This invention relates to a process for forming an arcuate rigid plastic plate. More particularly, it relates to a process for forming a curved, rigid plastic plate having integral projections of a predetermined pattern thereon, the curved plate being adapted to be mounted on a rotatable cylinder for use in punching, embossing, or other surface treating operations.

In many punching operations, such as, for example, punching holes or fissures into acoustical tile or panels, a flat plate is usually pressed into the surface of the dry fibrous material. Such flat plates have in relief thereon the design of the openings desired to be formed in the finished product, the plates being made of any of the conventional metals or alloys suitable for withstanding stress and wear. In order to increase the speed and efficiency of such a punching operation, it has been suggested in the past to replace the flat plates with rotatable metal cylinders, the cylinders having on their outer surface projections of the design or pattern desired to be formed in the finished product. In this manner, the product, such as acoustical tile, could be passed beneath the rotatable cylinder and be punched in a continuous operation. However, methods used for forming such cylindrical metal punches have a number of disadvantages which make the use of cylindrical metal punches unattractive in a commercial operation. For example, according to one method, individual irregular-shaped projections are fabricated by hand from steel or other suitable metals and welded individually to a metal cylinder in a desired pattern. Not only is the cost of producing cylindrical punches by this method prohibitive, but it is extremely difficult to replace or duplicate the pattern in the event it is damaged. As a result, while the use of cylindrical metal punches is more efficient than the previously used flat metal punches, the use of such cylindrical metal punches has been limited by their prohibitive cost.

In recent years, with the increased recognition of the many desirable properties of rigid plastics, it has been suggested to make printing plates, punches, dies and the like of such rigid plastics, for such rigid plastics may be fabricated into intricate patterns and designs at a lower cost than conventional metals and alloys used in making such products. The rigid plastics are also generally easier to handle than metals and/or alloys in forming such patterns and designs. Generally, the rigid plastic is cast in flat sheets having the desired pattern or design, and these flat sheets used as the printing plate, puuching plate, etc. When it has been desired to use such rigid plastic plates, punches, etc. on a curved base, the rigid plastic plate has been heated under pressure to obtain the desired curvature. However, subjecting the rigid plastic plates to such heat and pressure in order to curve the plate tends to warp the plate and distort the design or patern, making it unsuitable for applications where an exact reproducion of detail is desired. Therefore, there is a need for a process for producing rigid plastic plates, suitable for use as printing plates, punching plates, embossing dies, and the like, the plates having a curved cross section free from warping and/or distortion, and capable of being mounted on rotatable cylinders for continuous operation.

It is therefore an object of this invention to provide a process for making an arcuate, rigid plastic plate.

Another object of the present invention is to provide a process for making a curved, rigid plastic plate having integral projections of a predetermined pattern on one surface, the curved plate being adapted to be mounted on a rotatable cylinder for use in punching, embossing, or other surface treating operations.

A further object of this invention is to provide a process for forming an arcuate, rigid plastic punching plate adapted to be mounted on a rotatable cylinder for continuous operation.

Another object of this invention is to provide a process for forming a rigid plastic plate having an arcuate cross section, the plate being free from warpage and distortion.

Another object is to provide a cylindrical punch suitable for breaking the surface of an acoustical tile in a continuous operation.

These and other objects and advantages of the invention will become apparent from the following description and drawings of an embodiment of the invention.

Figure 1:
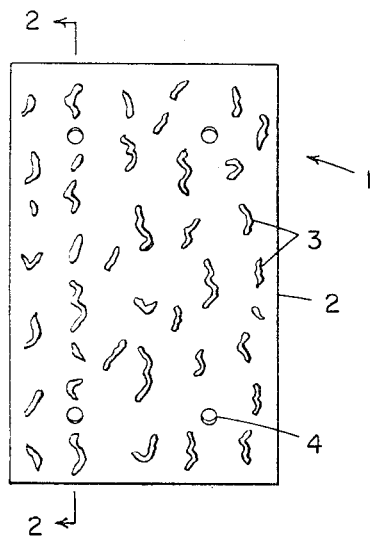
FIGURE 1 is a plan view of an arcuate, rigid plastic plate made according to the process of the present invention, this plate being especially well suited for use as a punching plate.
Figure 3:
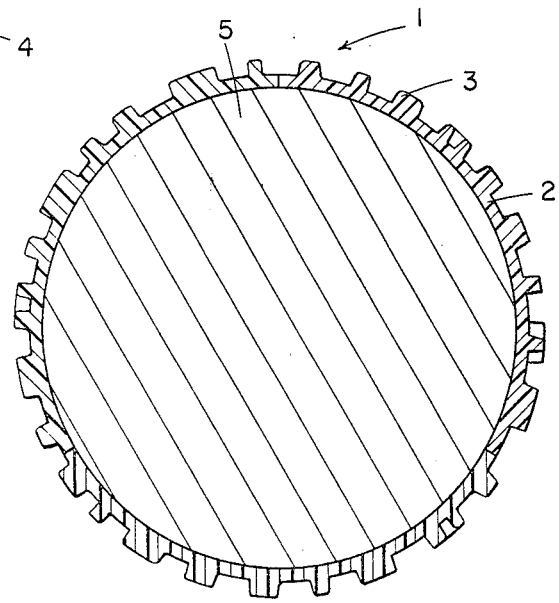
FIGURE 3 is a cross-sectional view of the arcuate plate mounted on a rotatable cylinder for a continuous operation.
Figure 2:
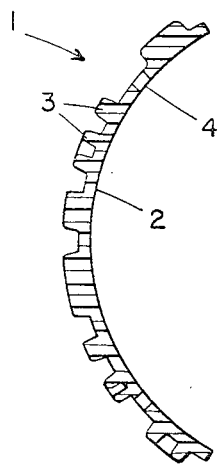
FIGURE 2 is a cross-sectional view taken through section lines 2—2 of FIGURE 1 and showing the arcuate shape of the plate and the integral projections on the face of the plate.

The present invention provides a process for forming a rigid plastic plate 1, comprising an arcuate plate 2 having integral projections 3 of any desired shape and pattern on the surface of the plate 2. The plate may be provided with a plurality of holes 4 extending through the plate for securing the plate to a rotatable cylinder. As is shown in FIGURES 2 and 3, the rigid plastic plate has an arcuate or curved cross-sectional shape, so that the plate may be mounted on a rotatable cylinder 5 for use in a continuous operation. The plastic plate, including the integral projections 3, is preferably formed of an epoxy resin, for epoxy resins provided the best combination of accuracy in forming the plate and wear resistance in use. However, other rigid, thermosetting synthetic resin materials may, of course, be used in the process of the present invention to form the arcuate plate. The curved rigid plastic plates illustrated in FIGURES 1 through 3 are especially well suited for use in a punching operation, such as, for example, punching fissures into acoustical tile or panels. The plates may, however, be used for other surface treating operations.

The process of the present invention, according to which such an arcuate plate is made, generally includes the steps of forming a flat, rigid female mold having recesses of the pattern or design to be reproduced. A flat male pattern is then made from this first female mold, the male pattern having projections conforming in size, shape, and location to the recesses formed in the flat female mold. Subsequently, a second flat female mold is reproduced from the flat male pattern, this flat female mold having recesses conforming in size, shape and location to the projections on the male pattern. This second flat female mold is formed of a material which is flexible and can be bent in an arc without cracking or rupture of the mold or appreciable distortion of the pattern or design. The flat, flexible female mold is placed in a suitable jig and bent into an arc of any desired curvature. While the flexible female mold is held in this position, the mold cavity is filled with a liquid thermosetting resin, and the resin allowed to harden and cure in the mold. After the resin has hardened and cured, the mold is removed from the jig and the flexible mold stripped from the rigid plastic plate which retains the curved configuration. In this manner, there is produced a curved plastic plate, free from warpage and distortion, the plate having projections conforming in shape, size, and location to the recesses in the flexible female mold. This curved plate provides an accurate reproduction of the desired design or pattern. If desired, the plastic plate may then be plated for added stability and wear resistance.

The arcuate plastic plate produced according to this process may then be mounted on and secured to a rotatable cylinder for use in printing, punching, embossing, or other surface treating operations. It has been found that such arcuate plates are especially well suited for use in punching fissures and/or holes into acoustical tiles or panels, such as mineral wool or mineral wool-cellulose fiber products. Thus, the arcuate plates are mounted on the rotatable cylinder and acoustical tile are passed beneath the cylinder. As the tile pass beneath the cylinder, the projections on the surface of the arcuate plate are pressed into the surface of the dry fibrous sheet. As these projections are pressed into the surface of the fibrous sheet, the desired design is formed in the acoustical material due to the compression and/or fracture of the fibers. As a result, sound absorbing fissures and/or holes are formed in the material. These openings contribute to an attractive and decorative appearance, aesthetically, and serve the useful function of increasing the noise reduction coefficient of the acoustical tile. This cylindrical punch, comprising the arcuate rigid plastic plates mounted on the cylindrical roll, is especially well suited for use in a continuous operation. However, the plates produced according to the present invention are not intended to be limited to only such use, for the curved plates may be used in other surface treating operations, such as, for example, printing plates, for embossing plastic film or thin gauge metal, punching a design into thin gauge metal, and the like.

Referring now in more detail to the process of the present invention, a flat rigid female mold having recesses of a predetermined pattern is first constructed. This female mold is preferably formed by cutting, routing or otherwise milling out recesses, forming the desired pattern in a relatively soft, easily shaped material, such as, for example, balsawood or other soft wood, insulation board or sheathing, mineral wool or cellulose fiber acoustical tile or panels, plaster, foamed synthetic resins, soft metal, and the like. The female mold may also be formed by pressing or punching the desired pattern into the mold material. The material used in forming this female mold must be capable of withstanding temperatures of about 200–300° F. for short periods of time without being adversely affected. Preferably, this female mold is made by routing out the desired pattern to form recesses having a depth of between about 0.01 to about 0.5 inch in a mineral wool acoustical tile. The recesses may, of course, have a greater or lesser depth depending on the material used to form the mold, the surface treating operation for which the rigid plate is to be used, the material to be surface treated, and the like. Mineral wool acoustical tile, generally having a starch binder and usually containing from about 60% to 85% of mineral wool fibers with or without additional cellulose fibers, has been found to provide the best combination of integrity, softness, and workability for use in constructing the flat, rigid female mold of the design desired to be reproduced. In some instances, a material may occur naturally or be formed by casting or similar techniques and have in its surface a pattern or design desired to be reproduced. If such a material is capable of withstanding temperatures of about 200–300° F. for short periods of time, it may be used as the female mold.

After the female mold has been made and the debris removed from the mold, a flat male pattern is reproduced from this rigid female mold. Thus, a dam is built up around the periphery of the female mold to form a mold cavity and the mold cavity filled with a liquid casting material. Preferably, a low-melting or fusible alloy, having a melting point of below about 180° F. is melted and poured into the mold cavity to completely fill the cavity. Suitable low-melting alloys which may be used to form this male pattern are Wood's metal, containing about 50% Bi, 24% Pb, 14% Sn and 12% Cd; Wood's alloy, containing about 50% Bi, 25% Pb, 12.5% Sn, and 12.5% Cd; Lipowitz's metal, containing about 50% Bi, 27% Pb, 13% Sn, and 10% Cd; "Cerrobend" alloy, containing about 50% Bi, 26.7% Pb, 13.3% Sn, and 10% Cd; "Cerrolow" alloys, which are bismuth alloys containing indium; "Cerrosafe" alloy, containing about 45% Bi, 38% Pb, 11% Sn, and 9% Cd; and the like. It is preferred to form the flat male pattern from such low-melting alloys in order to avoid the necessity of using heat-resistant materials for construction of the initial female mold. If the female mold is made of a heat-resistant material, higher melting alloys, such as lead alloys, Rose's alloy, sterotype metal and the like, may, of course, be used to form the male pattern. Also, if the initial female mold is formed of a relatively non-porous material, silicone rubber, resins such as epoxy resin, and similar materials may be used to form the male pattern. Preferably, the male pattern is formed of "Cerrobend" alloy, an eutectic alloy of bismuth, lead, tin and cadmium, having a melting point of about 158° F. and manufactured by the Cerro Corporation, New York, N.Y. In forming the male pattern of this material, the alloy is heated to a temperature of between about 200–300° F. to liquify it, and the molten alloy then poured into the mold cavity. Sufficient molten alloy is poured into the mold cavity to fill the recesses in the rigid female mold and to provide a flat plate about ⅛ to about ¾ inch or more in thickness above the surface of the female mold.

After the material used to form the male pattern has hardened, it is removed from the female mold. The resulting male pattern is a flat plate having on one surface integral projections conforming in shape, size and location to the recesses in the flat, rigid female mold.

After the male pattern has been so constructed, a second female mold is prepared from the male pattern described above. This second female mold is made of a material which is flexible and may be bent into an arc of any desired curvature without cracking or rupture of the mold or appreciable distortion of the mold pattern. Preferably, a liquid, room-temperature-vulcanizing silicone rubber, such as Silastic 521 or Silastic 588, obtained from the Dow Corning Corporation, is used to form this second female mold. This material is preferred for it has the properties of resiliency, flexibility, resistance to mechanical fatigue and provides an exact reproduction of surface detail. Thus, in forming the flexible mold, a dam is built around the periphery of the flat male pattern to provide a mold cavity, and the liquid silicone rubber is poured over the surface of the male pattern to a depth at least sufficient to cover all the projections extending from the surface of the male pattern, and the silicone rubber is allowed to harden. If desired, flexible cleats or keying blocks may be cast or embedded in the back of the female mold. Thus, according to a preferred method, a plurality of strips having beveled side edges are disposed across the top of the mold cavity in a fixed position a predetermined distance above and parallel to the rigid male pattern. Preferably, the strips are formed of wood. The liquid silicone rubber or other suitable liquid casting material is then poured into the mold cavity until the liquid reaches the level of the upper surface of the strips. After the liquid has hardened, the strips are removed, thereby forming integral, flexible trapazoidal cleats on the back of the flexible female mold. Cleats may also be provided in the back of the flexible mold by embedding strips of a flexible material in the flexible female mold before the molding material has hardened.

Flexible materials other than room-temperature-vulcanizable silicone rubber may, of course, be used to form this second female mold. For example, this flexible mold may be formed by vacuum-forming a plastic film over the male pattern by using conventional vacuum-forming techniques. When the plastic film is so formed over the male pattern, it provides a suitable flexible female mold. Other flexible materials which may be used to form this female mold include rubber and rubber-like materials which vulcanize, polymerize or otherwise harden at temperatures below the melting point of the material used to form the rigid male pattern.

When the silicone rubber or other flexible material has hardened, it is stripped from the male pattern. The resulting mold is a flat, flexible sheet having recesses conforming in size, shape and location to the projections on the male pattern, the flexible sheet being capable of being bent into an arc without cracking or rupture of the mold and without appreciable distortion of the pattern. In this manner, the flat rigid male pattern may be used as a master pattern for producing a large number of flexible female molds. Thus, since the male pattern is not damaged or adversely affected when the flexible female mold is reproduced form it, it may be used many times over to produce flexible female molds having recesses of a desired design or pattern.

The rigid arcuate plate is then reproduced from this flexible female mold by bending the flexible mold into a curved position and filling the mold cavity with a liquid, rigid, thermosetting resin while the flexible mold is maintained in the curved position. In this manner, the liquid resin fills the cavities and depressions in the female mold, thereby forming, upon hardening and curing, a rigid arcuate plate having integral projections of the desired shape and/or pattern.

According to a preferred method, the rigid arcuate plate is formed by placing the flexible female mold on an arc having a desired radius and conforming the flexible mold to the curvature of this arc. This arc should have a curvature slightly greater than the curvature of the rotatable cylinder on which the finished plate is to be mounted for operation. Thus, the curvature of the flexible female mold should be greater than the curvature of the rotatable cylinder by an amount equal to the thickness of the rigid plastic plate. For example, if the rotatable cylinder to be used in the surface treating operation has a diameter of ten inches, and the arcuate plastic plate is to have a thickness of one-half inch, not including the projections, the arc about which the flexible female mold is conformed should have a diameter of eleven inches. The flexible mold is maintained in this position by providing a backing material, such as plaster, around the flexible mold. Cleats cast or embedded in the back of the flexible mold serve to hold the mold firmly in position. Backing materials other than plaster may, of course, be used to maintain the flexible mold in a curved position while the rigid plastic plate is being formed. Thus, materials such as foundry sand, cements, formed resins, and other similar non-yielding supporting materials may be used to back up the curved, flexible female mold.

Figure 4:
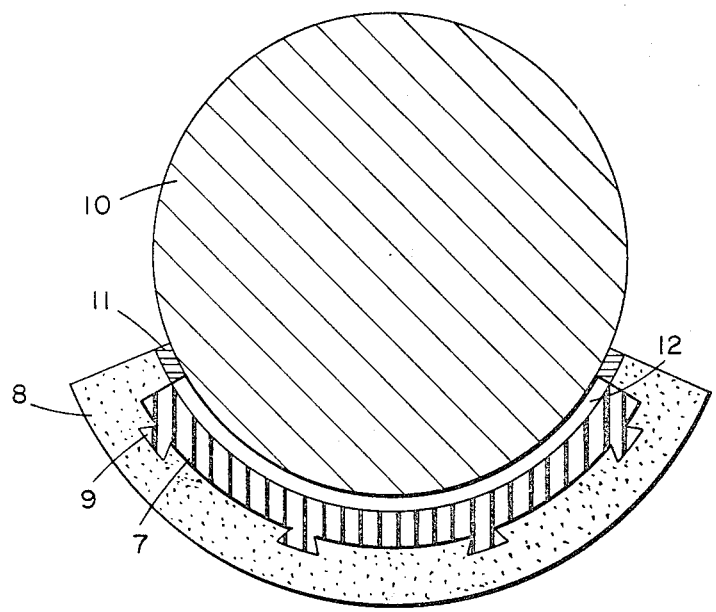
FIGURE 4 is a sectional view of a mold used in forming the arcuate plate of the present invention.

The plaster-backed flexible mold is then removed from this arc and secured to a casting drum, as illustrated in FIGURE 4, for production of the rigid arcuate plate. Thus, the flexible female mold 7, embedded in the plaster backing 8 and held firmly in position by means of integral cleats 9, is secured to a casting drum 10 by clamping means (not shown). Spacer blocks 11 are positioned between the flexible female mold 7 and the drum 10 in order to maintain the mold in a fixed spaced relation from the drum. The spacer blocks are positioned along the side edges and the bottom edge of the flexible mold 7, thereby forming a mold cavity 12 between the flexible female mold and the drum, the mold cavity 12 having an arcuate shape and being open only at the top. The thickness of mold cavity 12 may be varied as desired and corresponds to the thickness of the finished plate 2. Generally, the thickness of the arcuate plate, excluding the height of integral projections 3, may vary from about ⅛-inch to about ¾-inch or more.

A liquid, rigid, thermosetting resin is then poured into mold cavity 12 to completely fill the cavity. This pouring operation should be performed slowly to allow all of the air in the cavity to properly escape. It has been found desirable to allow the resin to cure for at least from about 8 to 12 hours at room temperature before removing it from the mold. The resin may, of course, be cured at elevated temperatures for shorter periods of time.

In this manner, when the resin has cured and is removed from the flexible mold, there is produced a rigid plastic plate having an arcuate cross-sectional shape, the plate having on its surface integral projections of the desired design or pattern, the projections conforming in shape, size and location to the recesses in the female mold. After the flash is removed in any suitable manner, holes 4 may be drilled through the plate. The plate is then complete and ready for use. Thus, screws may be inserted in the holes to secure the arcuate plate to a rotatable cylinder. Alternatively, the arcuate plate may be adhesively bonded to the cylinder, thereby eliminating the need for drilling holes in the plate. Thus, the plate may be mounted on and secured to rotatable cylinder 5 as shown in FIGURE 3, and is ready for use in printing, punching, embossing or other surface treating operations.

Figure 5:
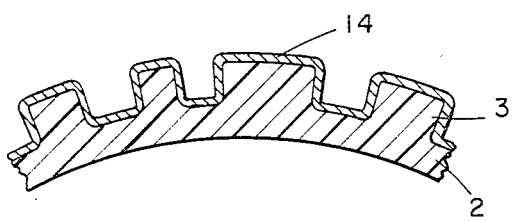
FIGURE 5 is a fragmentary sectional view of the arcuate plate of the present invention, the plate having wear-resistant material coated on its surface.

If desired, the arcuate plate may, before mounting on the cylindrical roll, be coated with a metal or other abrasion-resistant material for increased stability and wear resistance. Any conventional metal-to-plastic plating technique may be used to form such a coating. According to one preferred method, the arcuate plate is coated with a deposit consisting of a metal matrix, such as nickel, cobalt, nickel-cobalt, copper, iron, brass, chromium, cadmium, silver, gold, platinum or zinc, the matrix containing from about 10% to 50% by volume of one or more finely divided, abrasion-resistant materials, such as silicon carbide, boron carbide, diamonds, aluminum oxide, tungsten carbide, chromium carbide, metallic powders or mica. Preferably, the arcuate plastic plate is coated with a layer of 1000 mesh SiC in a hard nickel matrix, the coating having a thickness of from about 0.002 to 0.015 inch. As shown in FIGURE 5, the coating 14 forms a continuous layer over the integral projections 3 as well as the plate 2. Generally, in order to form this coating on the arcuate plate, the plate is cleaned, acid neutralized, washed, dried, sprayed with a silver suspension, and then plated according to the process disclosed and claimed in U.S. Patent No. 3,061,525.

Generally, it is preferred to use a filled epoxy resin in forming the rigid arcuate plate. One example of a filled epoxy resin which is suitable for this purpose is Liquid Epoxy 341 Casting Resin obtained from Kish Industries of Lansing, Michigan. This casting resin is a metal-powder-filled epoxy resin. The hardner sold under the designation "40-A Hardener" by the same company may be satisfactorily used as the catalyst. Other conventional epoxy resin fillers and hardners may, of course, be used.

The present invention, as described and illustrated hereinabove and as defined in the appended claims, provides a process for forming an arcuate rigid plate adapted to be mounted on a rotatable cylinder for use, in a continuous manner, in punching, printing, embossing, and other similar surface treating operations. Since the plates are made of a rigid plastic, they can be manufactured at lower costs that metal plates of the same type. Due to the fact that the plates are cast in an arcuate shape, they are not subject to warpage or distortion as results when flat plates of rigid plastic are heated under pressure in order to obtain an arcuate shape.

It will be understood that various changes in the details, materials, steps and arrangements which have been herein described and illustrated in order to explain the nature of the invention may be made by those skilled in the art, within the principle and scope of the invention as set forth in the appended claims.

I claim:

1. A process for forming an arcuate rigid plastic plate having projections of a predetermined pattern on a surface thereof, said process comprising forming a flat female mold having recesses of a predetermined pattern, forming a flat male pattern from said flat female mold, forming a flat, flexible female mold from said male pattern, and forming an arcuate rigid plastic plate from said flexible female mold by filling said flexible female mold with a rigid plastic forming material while said flexible mold is bent into an arc having a desired curvature, and maintaining the curvature of said flexible mold while said plastic hardens and cures, and removing said flexible mold from said arcuate plate, thereby providing a rigid plastic plate having a curved cross-sectional shape, said plate having integral projections of said predetermined pattern on a surface thereof.

2. A process as defined in claim 1 in which said rigid plastic plate integral projections are covered with a wear-resistant high density coating of about .002 to .015 inch thickness.

3. A process as defined in claim 2 in which said wear-resistant material consists essentially of finely divided silicon carbide in a matrix of nickel.

4. A process for forming an arcuate, rigid plastic plate having projections of a predetermined pattern on a surface thereof, said processes comprising forming a flat, rigid female mold having recesses of a predetermined pattern by forming said pattern in a relatively soft, easily formed material, forming a flat male pattern having projections conforming in shape to the recesses in said female mold by filling said female mold with a hardenable liquid casting material, removing the flat male pattern from said rigid female mold, forming a flat, flexible female mold from said flat male pattern, said flexible female mold having recesses conforming in shape to the projections on the male pattern, forming an arcuate rigid plastic plate from said flexible female mold by forming the flexible female mold into an arc having a desired curvature to provide a mold cavity having an arcuate cross-sectional shape, filling said mold cavity with a rigid plastic forming material while maintaining the curvature of the flexible female mold, and curing the plastic, and removing the cured, rigid plastic plate from the flexible female mold, said rigid plastic plate having an arcuate shape and having projections conforming in shape to the recesses in said flexible female mold.

5. A process as defined in claim 4 in which said rigid female mold is formed from a non-thermoplastic material which is capable of withstanding temperatures in the range of from about 200° to 300° F. for short periods of time.

6. A process as defined in claim 4 in which said rigid female mold is formed by routing out said pattern in a mineral wool acoustical tile.

7. A process as defined in claim 4 in which said flat male pattern is formed by filling said rigid female mold with a molten metal alloy, said alloy having a melting point of below about 180° F.

8. A process as defined in claim 7 in which said alloy is an eutectic alloy of bismuth, lead, tin and cadmium.

9. A process as defined in claim 4 in which said flat male pattern is formed by building a dam around the periphery of said rigid female mold, thereby forming a mold cavity, filling said mold cavity with a molten fusible alloy, and solidifying said molten alloy.

10. A process as defined in claim 4 in which said flexible female mold is formed by vacuum forming a plastic sheet over the flat male pattern.

11. A process as denfied in claim 4 in which said flexible female mold is formed by building a dam around the periphery of said flat male pattern thereby providing a mold cavity, filling said mold cavity with a liquid, room-temperature-vulcanizable silicon rubber, and solidifying said liquid silicone rubber.

12. A process as defined in claim 11 in which a plurality of integral, flexible cleats are formed on the back of the silicone rubber mold.

13. A process as defined in claim 4 in which the flexible female mold is maintained in a curved position by surrounding the curved mold with a backing material.

14. A process as defined in claim 4 in which the resin is an epoxy resin.

15. A process as defined in claim 4 in which the cured rigid plastic plate integral projections are covered with a wear-resistant high density coating of about .002 to 0.15 inch thickness.

16. A process as defined in claim 4 in which a thin layer of finely divided silicon carbide is uniformly dispersed in a nickel matrix deposited on the surface of said cured, rigid plastic plate.

17. A process for forming an arcuate, rigid plastic punching plate, said process consisting essentially of routing out recesses of a predetermined pattern in a mineral wool acoustical tile to provide a flat, rigid female mold, said recesses having a depth of between about 0.01 to 0.5 inch, building a dam around the periphery of said female mold to provide a mold cavity, heating an eutectic metal alloy consisting of about 50% bismuth, 27% lead, 13% tin, and 10% cadmium to a temperature of between about 200° to 300° F. to liquify said alloy, filling said mold cavity with said molten alloy, allowing the molten alloy cast to solidify in the mold cavity, removing the solid cast from the female mold, thereby providing a flat male pattern having projections conforming in shape to the recesses in said female mold, building a dam around the periphery of said flat male pattern to provide a mold cavity above said pattern, said projections extending into the mold cavity, filling said mold cavity with a liquid, room-temperature-vulcanizable silicone rubber, allowing the silicone rubber to solidify in the mold cavity, removing the solidified silicone rubber from said male pattern, thereby providing a flat, flexible female mold having recesses which conform in shape to the projections on said male pattern, forming said flat, flexible female mold into an arc, maintaining the curvature of said flexible female mold by surrounding said mold with plaster, providing an arcuate mold cavity above the recesses in said flexible female mold, filling said mold cavity with a liquid epoxy resin, curing said resin to provide an arcuate rigid plastic plate having projections conforming in shape to the recesses in said flexible female mold, and removing said rigid plate from said flexible female mold.

No references cited.

ALEXANDER H. BRODMERKEL, *Primary Examiner.*

J. R. THURLOW, *Assistant Examiner.*